United States Patent
Gu et al.

(10) Patent No.: US 11,144,312 B2
(45) Date of Patent: Oct. 12, 2021

(54) MANAGEMENT METHOD FOR PRESET THIRD-PARTY APPLICATIONS, INTELLIGENT TERMINAL AND STORAGE MEDIUM

(71) Applicant: ZTE CORPORATION, Guangdong (CN)

(72) Inventors: Jincun Gu, Guangdong (CN); Bingjun Shao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/764,454

(22) PCT Filed: Nov. 16, 2018

(86) PCT No.: PCT/CN2018/116012
§ 371 (c)(1),
(2) Date: May 15, 2020

(87) PCT Pub. No.: WO2019/096269
PCT Pub. Date: May 23, 2019

(65) Prior Publication Data
US 2020/0356361 A1   Nov. 12, 2020

(30) Foreign Application Priority Data

Nov. 16, 2017   (CN) .......................... 201711139325.8

(51) Int. Cl.
*G06F 8/71* (2018.01)
*G06F 8/77* (2018.01)
(Continued)

(52) U.S. Cl.
CPC .................. *G06F 8/71* (2013.01); *G06F 8/61* (2013.01); *G06F 8/77* (2013.01); *G06F 11/3419* (2013.01)

(58) Field of Classification Search
USPC ......................................................... 717/178
See application file for complete search history.

(56) References Cited

U.S. PATENT DOCUMENTS

2004/0043753 A1* 3/2004 Wake .................... H04M 15/52
                                                      455/406
2006/0059463 A1* 3/2006 Janssen ..................... G06F 8/71
                                                      717/120
(Continued)

FOREIGN PATENT DOCUMENTS

CN    104021218 A    9/2014
CN    105187514 A    12/2015
(Continued)

OTHER PUBLICATIONS

WIPO, International Search Report dated Jan. 21, 2019.

*Primary Examiner* — John Q Chavis (57) ABSTRACT

The present disclosure provides a management method for preset third-party applications, an intelligent terminal in which a control center is preset, a server and a storage medium. The management method includes: detecting by the control center whether to download a third-party application in a preset third-party application list according to set detection condition; and, if the detection result is "yes", downloading the third-party application in the third-party application list from a server to a data storage partition by the control center.

12 Claims, 4 Drawing Sheets

(51) Int. Cl.
*G06F 8/61* (2018.01)
*G06F 11/34* (2006.01)

(56) References Cited

U.S. PATENT DOCUMENTS

| | | | | |
|---|---|---|---|---|
| 2013/0247031 A1* | 9/2013 | He | ............ | H04L 67/16 |
| | | | | 717/178 |
| 2014/0380295 A1* | 12/2014 | Chen | ............ | G06F 8/65 |
| | | | | 717/170 |
| 2015/0326651 A1* | 11/2015 | Ormseth | ............ | H04L 51/32 |
| | | | | 709/204 |
| 2017/0242666 A1* | 8/2017 | Savliwala | ............ | H04L 67/04 |

FOREIGN PATENT DOCUMENTS

| | | | | |
|---|---|---|---|---|
| CN | 106028306 A | 10/2016 | | |
| CN | 106550124 A | 3/2017 | | |
| FR | 3137994 A2 * | 3/2017 | ............. | G06F 9/445 |

\* cited by examiner

MANAGEMENT METHOD FOR PRESET THIRD-PARTY APPLICATIONS, INTELLIGENT TERMINAL AND STORAGE MEDIUM

CROSS-REFERENCE TO RELATED APPLICATIONS

This is a National Phase Application filed under 35 U.S.C. 371 as a national stage of PCT/CN2018/116012, filed on Nov. 16, 2018, an application claiming the priority of Chinese Patent Application No. 201711139325.8, filed on Nov. 16, 2017, the contents of which are incorporated herein in their entirety by reference.

TECHNICAL FIELD

The present disclosure relates to, but is not limited to, an intelligent terminal, and in particular, to a management method for preset third-party applications, an intelligent terminal, and a storage medium.

BACKGROUND

In recent years, mobile terminals installed with Android system have been accepted by a large number of users due to their excellent performance and good user experience. Hardware manufacturers load third-party applications into the mobile terminals at the request of some network providers, for example, the hardware manufacturers are required to load the third-party applications into custom mobile terminals by China Mobile, China Telecom or China Unicom according to their respective requirements.

At present, mobile phone manufacturers preset third-party applications in a directory of a system partition, and then links are established in a data partition when the mobile phone is powered on for the first time (including being restored to factory settings), so that the third-party applications may be displayed on a desktop of a launcher. The data preset in the system partition cannot be deleted even if the third-party application is uninstalled by a user, because only the data in the data partition is actually deleted but the application in the system partition still exists after the uninstallation, which results in that the memory of the system is still occupied. In addition, since the third-party applications are preset before leaving the factory, if some of the third-party applications need to be upgraded or deleted later, only Firmware Over-The-Air (FOTA) versions may achieve the upgrade. If a new FOTA version of an old maintained project is released and Compatibility Test Suite is involved, a large number of patches must be incorporated again after switching the FOTA package, which occupies storage space and requires heavy workload. If the user does not upgrade a FOTA package, related modifications cannot take effect.

SUMMARY

An objective of the present disclosure is to overcome the defects in the related art, so that the present disclosure provides a management method for preset third-party applications, an intelligent terminal, and a storage medium, which can effectively manage third-party applications.

According to an aspect of the present disclosure, a management method for preset third-party applications is provided, and is applied to an intelligent terminal in which a control center is preset. The method includes: detecting by the control center whether to download a third-party application in a preset third-party application list according to set detection condition; and if the detection result is "yes", downloading the third-party application in the third-party application list to a data storage partition by the control center.

According to another aspect of the present disclosure, an intelligent terminal is provided, and the intelligent terminal includes a memory having a computer program stored therein, and a processor. When the computer program is executed by the processor, the processor performs the management method for preset third-party applications according to the present disclosure.

According to another aspect of the present disclosure, a computer-readable storage medium is provided, and has a computer program stored therein. When the computer program is executed by a processor, the processor performs the management method for preset third-party applications according to the present disclosure.

The above description is only an overview of the technical solutions of the present disclosure. Specific embodiments of the present disclosure are described below, so as to facilitate more clear understanding of the technical means of the present disclosure to enable implementation according to the specification, and make the above and other objectives, features, and advantages of the present disclosure clearer and understandable.

BRIEF DESCRIPTION OF THE DRAWINGS

In order to illustrate the technical solutions in the embodiments of the present disclosure or the related art more clearly, the drawings used in the description of the embodiments or the related art are briefly introduced below. Obviously, the drawings in the description below are merely for some embodiments of the present disclosure, and those skilled in the art may obtain other drawings according to the following drawings without making any creative efforts.

DETAILED DESCRIPTION

The technical solutions in the embodiments of the present disclosure are described below clearly and completely with reference to the drawings of the embodiments of the present disclosure. Obviously, the embodiments described herein are merely some embodiments of the present disclosure, rather than all embodiments. All other embodiments, which are derived by those skilled in the art from the embodiments disclosed herein without making any creative effort, shall fall within the protection scope of the present disclosure.

In order to solve the problem that the system space is occupied because the manufacturers preset the third-party applications in the system partition in the related art, the present disclosure provides a management method for preset third-party applications, which is applied to an intelligent terminal. The intelligent terminal of the present disclosure may include mobile terminals such as a mobile phone, a smart phone, a digital broadcast receiver, a personal digital assistant (PDA), a PAD (tablet computer), a portable multimedia player (PMP) and a navigation device, and fixed terminals such as a digital TV.

Figure 1:
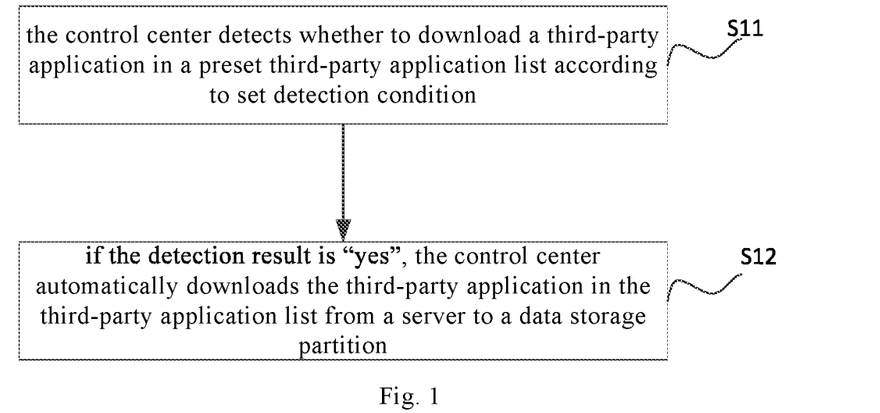
FIG. 1 is a flowchart illustrating a management method for preset third-party applications according to an embodiment of the present disclosure.

According to an embodiment of the present disclosure, a control center is preset in an intelligent terminal. The control center is a system application which is invisible for a user, and cannot be operated by the user. In the embodiment, a management method for preset third-party applications is implemented by the control center. With reference to FIG. 1, the method includes the following steps S11 and S12.

In step S11, the control center detects whether to download a third-party application in a preset third-party application list according to set detection condition. The third-party application may be a normal application.

In step S12, if the detection result is "yes", the control center automatically downloads the third-party application in the third-party application list from a server to a data storage partition.

In a specific embodiment of the present disclosure, the step of detecting, by the control center, whether to download the third-party application in the preset third-party application list according to the set detection condition may include the following steps.

The control center detects whether the intelligent terminal is powered on for the first time (including being powered on for the first time after restoring to factory settings) and is connected to a wireless network, and if yes, the control center detects a to-be-downloaded third-party application in a preset third-party application list; otherwise, nothing needs to be downloaded. The third-party application is downloaded under the condition that the wireless network is connected according to the embodiment, so as to avoid consumption of data traffic caused by downloading. The wireless network includes a WIFI network, or other wireless networks. The embodiment makes no specific limitation to the wireless network.

According to the embodiment of the present disclosure, the method may further include: the control center synchronizes the third-party application list with the server periodically; and the control center downloads an updated third-party application to the data storage partition according to the synchronized third-party application list.

In the embodiment of the present disclosure, a plurality of third-party application lists of each project are stored in the server. The third-party application list includes one or more pieces of the following information: application name, package name, icon, class name and download address of each third-party application, and may be adjusted according to software developers. The third-party application list may be flexibly set by those skilled in the art, and is not specifically limited in the embodiment. According to the present application, by comparing the third-party application list, it is found whether there is a new third-party application, so as to update the third-party application from the server, which ensures updating the applications in time. In an exemplary embodiment, the control center synchronizes the third-party application list with the server once a month, and the synchronization and update time may be adjusted as required, and is not specifically limited in the embodiment.

According to the method in the embodiment of the present disclosure, it is unnecessary to preset the third-party applications in the system partition, so that the problem that the third-party applications always occupy the system space is overcome. Moreover, the method according to the embodiment of the present disclosure may automatically update the new third-party applications to dynamically add, delete and replace the third-party applications, so that effective management of the third-party applications is achieved; and the method also solves the problem that related modifications cannot take effect if the user does not upgrade a FOTA package.

Figure 2:
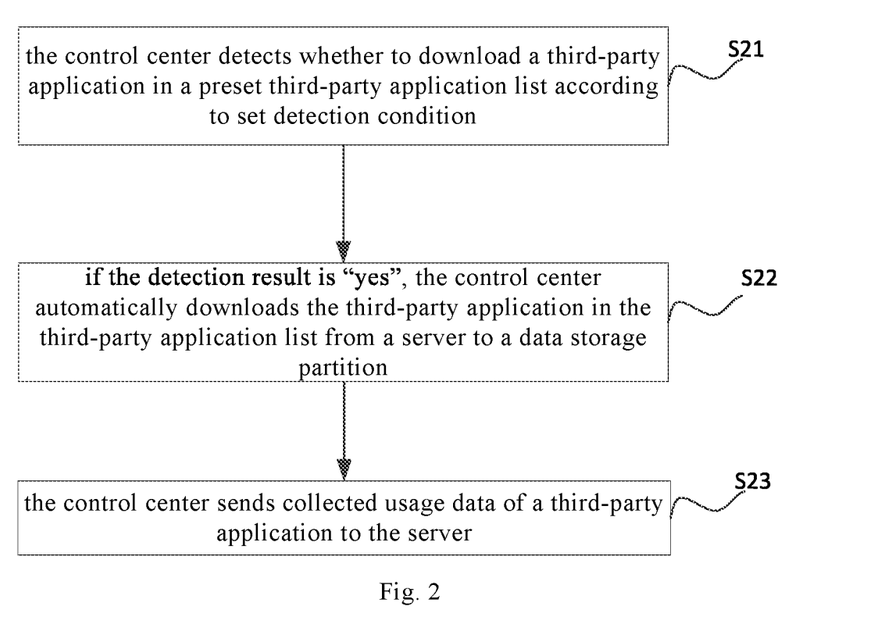
FIG. 2 is a flowchart illustrating a management method for preset third-party applications according to another embodiment of the present disclosure.

According to an embodiment of the present disclosure, a management method for preset third-party applications is provided, and is applied to an intelligent terminal in which a control center is preset. As shown in FIG. 2, the method includes steps S21 to S23.

In step S21, the control center detects whether to download a third-party application in a preset third-party application list according to set detection condition.

In step S22, if the detection result is "yes", the control center automatically downloads the third-party application in the third-party application list from a server to a data storage partition.

In step S23, the control center sends collected usage data of a third-party application to the server.

In the embodiment, the control center sends the usage data of the third-party application to the server periodically, for example, once a month. The usage data of the third-party application include: times of starting up the third-party application, or the startup time and the exit time of the third-party application, or the startup time, the exit time and the times of starting up the third-party application, and other usage data collected as required. The purpose of collecting the startup time and the exit time of the third-party application is to figure out whether the third-party application is popular according to the usage of the third-party application.

The implementation of the steps S21 and S22 in the embodiment are the same as the implementation of the steps S11 and S12, and thus will not be repeated here.

In the embodiment, the control center may collect data such as the time when the user starts the third-party application and the elapsed time of the third-party application, and then transmit the data to the server. The embodiment of the present disclosure not only realizes effective management of the third-party applications, but also enables Big Data analysis by using the data of the third-party applications, so as to guide third-party application developers to improve the application.

According to an embodiment of the present disclosure, a management method for preset third-party applications is provided, and is applied to an intelligent terminal in which a control center and a third-party application shortcut are preset, and it is possible that a plurality of third-party application shortcuts are preset. The third-party application shortcut may be a system application, has the application name and icon of the corresponding third-party application, and calls the control center after being clicked.

In addition to the above steps, the method according to the embodiment may further include: the control center determines whether the third-party application corresponding to the third-party application shortcut has been downloaded when detecting that the third-party application shortcut is triggered, and if not, downloads the third-party application corresponding to the third-party application shortcut to the data storage partition; if the third-party application corresponding to the third-party application shortcut has been downloaded, the third-party application is started directly. In the embodiment, the third-party application may not have properties of a launcher and thus cannot be displayed on a desktop of a launcher, so that it is not displayed in a main menu, otherwise, two identical icons are displayed.

According to the embodiment, when it is determined to download the third-party application corresponding to the third-party application shortcut to the data storage partition, the control center may detect whether the intelligent terminal is connected to a wireless network, which includes, but is not limited, to a WIFI network.

If the intelligent terminal is connected to the wireless network, the third-party application corresponding to the third-party application shortcut is downloaded to the data storage partition; and if not, a prompt asking for a confirmation of the downloading is issued, and the third-party application corresponding to the third-party application shortcut is downloaded to the data storage partition when receiving the confirmation. Other technical features are the same as those described in the above embodiment, and thus are not repeated here.

Figure 3:
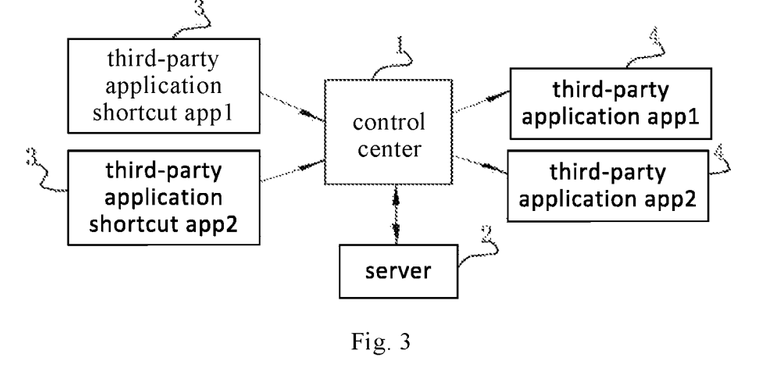
FIG. 3 is an architecture diagram of a third-party application according to an embodiment of the present disclosure.

In order to explain the implementation of the method of the present disclosure in more detail, a mobile phone is taken as an example of the intelligent terminal and a mobile phone APP is taken as an example of the third-party application in the embodiment. As shown in FIG. 3, a control center 1 and two third-party application shortcuts 3 are preset in a system of the mobile phone. The third-party application shortcuts 3 are a third-party application shortcut app1, and a third-party application shortcut app2. A server 2 is configured to store third-party applications 4 which are a third-party application app1 and a third-party application app2. An input terminal of the control center 1 is connected with output terminals of the third-party application shortcuts 3 separately, the input terminal and an output terminal of the control center 1 are connected with the server 2 separately, and the control center 1 is called through the third-party application shortcuts 3 to start the third-party applications 4, as shown in FIG. 3. The method according to the embodiment of the present disclosure is illustrated in detail below by two examples.

Figure 4:
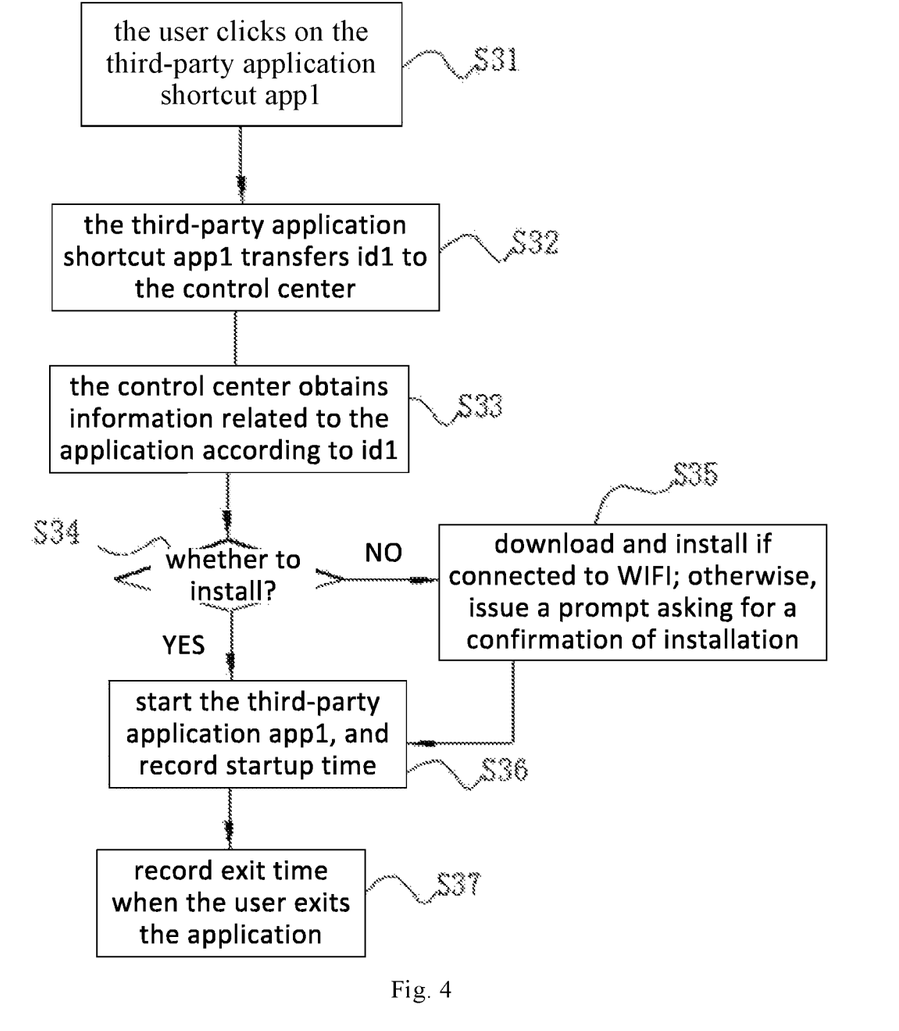
FIG. 4 is a flowchart illustrating a process of starting a third-party application according to an embodiment of the present disclosure.

Example One, as shown in FIG. 4, a method of starting a third-party application with the management method for preset third-party applications according to the embodiment of the present disclosure includes the following steps S31 to S37.

In step S31, when the user clicks on the third-party application shortcut app1, the third-party application shortcut app1 is triggered.

In step S32, the third-party application shortcut app1 starts the control center and transfers an input parameter 1 (id1) to the control center.

In step S33, the control center searches the third-party application list according to the input parameter 1 (id1) to obtain the package name and download address of the corresponding third-party application.

In step S34, it is determined whether the third-party application corresponding to the third-party application shortcut has been downloaded and installed (under normal conditions, all third-party application programs are automatically downloaded and installed in the background when an intelligent terminal is powered on for the first time and connected to WIFI), and if so, the step S36 is directly performed, otherwise, the step S35 is then performed.

In step S35, the third-party application corresponding to the third-party application shortcut is downloaded to the data storage partition of the intelligent terminal, and then the step S36 is performed. Furthermore, when it is determined to download the third-party application corresponding to the third-party application shortcut to the data storage partition, the control center needs to detect whether the intelligent terminal is connected to a wireless network; if yes, the third-party application corresponding to the third-party application shortcut is downloaded and installed to the data storage partition; otherwise, a prompt asking for a confirmation of the downloading is issued, and the third-party application corresponding to the third-party application shortcut is downloaded and installed in the data storage partition of the intelligent terminal when receiving the confirmation of the downloading.

In step S36, the third-party app1 is started, and the control center records the startup time of the third-party app 1.

In step S37, when the user exits the third-party app1, the control center records the exit time of the third-party app 1.

Figure 5:
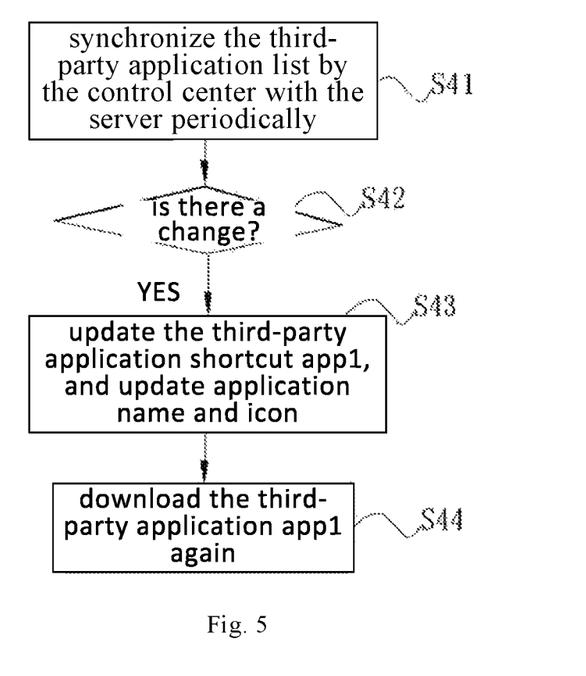
FIG. 5 is a flowchart illustrating a process of updating a third-party application according to an embodiment of the present disclosure.

Example Two, as shown in FIG. 5, a process of periodically synchronizing the third-party application list by the control center with the server includes the following steps S41 to S44.

In step S41, the control center periodically synchronizes the third-party application list with the server.

In step S42, the control center compares the original third-party application list (the local third-party application list) with the synchronized third-party application list to determine whether there is a change.

In step S43, if it is determined that the third-party application 1 changes (for example, the package name changes), a new third-party application shortcut app1 is downloaded from the server, and upgrade is performed to update the application name and icon of the third-party application shortcut app1. In this way, the name and icon of the third-party application shortcut app1 have been replaced with those of the third-party application shortcut app1 of the new third-party application 1.

In step S44, the third-party application 1 is downloaded and installed again according to the download address in the updated third-party application list.

According to the present disclosure, it is unnecessary to preset the third-party applications in the system partition, so that the system space occupied by the third-party applications is reduced; the new third-party applications may be automatically updated to dynamically add, delete and replace the third-party applications, so that the third-party applications are effectively managed.

According to an embodiment of the present disclosure, a management method for preset third-party applications is provided, and is applied to an intelligent terminal in which a control center and a third-party application shortcut are preset.

The control center detects whether to download a third-party application in a preset third-party application list according to set detection condition. Specifically, the management method includes: the control center detects whether the intelligent terminal is powered on for the first time and connected to a wireless network, and if yes, detects a to-be-downloaded third-party application in the preset third-party application list; otherwise, the control center downloads the third-party application corresponding to the third-party application shortcut to a data storage partition when detecting that the third-party application shortcut is triggered. Other technical features are the same as those described in the above embodiments, and thus are not repeated here.

According to an embodiment of the present disclosure, an intelligent terminal is provided, and may include mobile terminals such as a mobile phone, a smart phone, a digital broadcast receiver, a PDA, a PAD (tablet computer), a PMP and a navigation device, and fixed terminals such as a digital TV.

The intelligent terminal according to the embodiment includes a memory, a processor, and a computer program stored in the memory and capable of being executed by the processor. When the computer program is executed by the processor, the processor performs the management method for preset third-party applications according to the embodiments of the present disclosure.

According to an embodiment of the present disclosure, a computer-readable storage medium is provided, and has a computer program stored therein. When the computer program is executed by a processor, the processor performs the management method for preset third-party applications according to the embodiments of the present disclosure.

In the embodiment, the storage medium may include, but is not limited to, a read-only memory (ROM), a random-access memory (RAM), a magnetic disk or an optical disc.

Obviously, those skilled in the art may make various modifications and variations to the present disclosure without departing from the spirit and scope of the present disclosure. In such case, if those modifications and variations of the present disclosure are within the scope of the claims of the present disclosure and equivalent technologies thereof, the present disclosure is intended to include those modifications and variations.

What is claimed is:

1. A management method for preset third-party applications, applied to an intelligent terminal in which a control center is preset, comprising:
    detecting, by the control center, whether to download a third-party application in a preset third-party application list according to set detection condition; and,
    in response to that the detection result is "yes", downloading, by the control center, the third-party application in the third-party application list from a server to a data storage partition,
    wherein a third-party application shortcut is preset in the intelligent terminal, and the method further comprises:
    determining, by the control center, whether a third-party application corresponding to the third-party application shortcut has been downloaded when detecting that the third-party application shortcut is triggered;
    downloading the third-party application corresponding to the third-party application shortcut to the data storage partition in response to that the third-party application corresponding to the third-party application shortcut has not been downloaded; and
    directly starting the third-party application in response to that the third-party application corresponding to the third-party application shortcut has been downloaded,
    wherein the step of downloading the third-party application corresponding to the third-party application shortcut to the data storage partition comprises:
    detecting, by the control center, whether the intelligent terminal is connected to a wireless network;
    downloading the third-party application corresponding to the third-party application shortcut to the data storage partition in response to that the intelligent terminal is connected to the wireless network; and
    issuing a prompt asking for a confirmation of downloading in response to that the intelligent terminal is not connected to the wireless network, and downloading the third-party application corresponding to the third-party application shortcut to the data storage partition when receiving the confirmation.

2. The management method for preset third-party applications of claim 1, further comprising:
    synchronizing, by the control center, the third-party application list with the server periodically; and
    downloading, by the control center, an updated third-party application to the data storage partition according to the synchronized third-party application list.

3. The management method for preset third-party applications of claim 1, wherein the third-party application list comprises one or more pieces of the following information: application name, package name, icon, class name and download address of each third-party application.

4. The management method for preset third-party applications of claim 1, further comprising:
    sending, by the control center, collected usage data of a third-party application to the server.

5. The management method for preset third-party applications of claim 4, wherein the usage data of the third-party application comprises: times of starting up the third-party application; or startup time and exit time of the third-party application; or the startup time, the exit time and the times of starting up of the third-party application.

6. The management method for preset third-party applications of claim 1, wherein the step of detecting, by the control center, whether to download the third-party application in the preset third-party application list comprises:
    detecting, by the control center, whether the intelligent terminal is powered on for the first time and connected to a wireless network; and
    automatically downloading all third-party applications in the third-party application list to the data storage partition in response to that it is detected that the intelligent terminal is powered on for the first time and connected to the wireless network.

7. The management method for preset third-party applications of claim 1, wherein
    the step of detecting, by the control center, whether to download the third-party application in the preset third-party application list according to the set detection condition comprises:
    detecting, by the control center, whether the intelligent terminal is powered on for the first time and connected to a wireless network; and
    if yes, detecting a to-be-downloaded third-party application in the preset third-party application list; otherwise, downloading, by the control center, a third-party application corresponding to the third-party application shortcut to the data storage partition when detecting that the third-party application shortcut is triggered.

8. The management method for preset third-party applications of claim 7, wherein the step of downloading the third-party application corresponding to the third-party application shortcut to the data storage partition comprises:
    detecting, by the control center, whether the intelligent terminal is connected to the wireless network;
    downloading the third-party application corresponding to the third-party application shortcut to the data storage partition in response to that the intelligent terminal is connected to the wireless network; and
    issuing a prompt asking for a confirmation of downloading in response to that the intelligent terminal is not connected to the wireless network, and downloading the third-party application corresponding to the third-party application shortcut to the data storage partition when receiving the confirmation.

9. An intelligent terminal, comprising a memory having a computer program stored therein, and a processor, and when the computer program is executed by the processor, the processor performs the management method for preset third-party applications of claim 1.

10. A computer-readable storage medium having a computer program stored therein, and when the computer program is executed by a processor, the processor performs the management method for preset third-party applications of claim 1.

11. The management method for preset third-party applications of claim 1, wherein the control center is a system application which is invisible for a user, and is not be operated by the user.

12. The management method for preset third-party applications of claim 1, wherein the third-party application shortcut is a system application, which has the application name and icon of the corresponding third-party application, and calls the control center after being clicked.

* * * * *